UNITED STATES PATENT OFFICE 2,109,594

MOLDING COMPOSITIONS

Maurice L. Macht, Jersey City, N. J., assignor to E. I. du Pont de Nemours & Company, Wilmington, Del., a corporation of Delaware No Drawing. Application October 28, 1936, Serial No. 108,099

8 Claims. (Cl. 106—40)

This invention relates to molding compositions and, more particularly, to cellulose acetate molding compositions having unique properties.

For certain purposes it is desirable for articles molded from cellulose acetate molding compositions to have a greater than ordinary degree of rigidity while extreme toughness and strength are relatively unimportant. Heretofore, the art has encountered great difficulty in formulating a cellulose acetate molding composition that has acceptable molding properties and yet will give an article of the desired rigidity and, at the same time, possessing reasonable strength and toughness and being free from exudation. For a composition to have satisfactory molding properties it must have an adequate degree of mobility at a reasonable temperature; this is particularly true where the composition is to be injection molded but is also of importance where the article is to be compression molded.

These requirements of rigidity, reasonable toughness and strength, and mobility for molding, are characteristically contradictory inasmuch as rigidity is ordinarily predicated upon relatively low plasticizer content which makes the material less readily moldable so that, unless the conditions of molding are extreme, the material is apt to be inadequately welded by the molding process and hence deficient in strength and toughness. The use of a high plasticizer content, in order to make the molding more easy, ordinarily results in improving the toughness of the molded article, both inherently and because a readily molded composition becomes more thoroughly welded in the molding, but the use of increased plasticizer content diminishes the rigidity of the mass. Also, the increased plasticizer content depresses the softening temperature of the molded article and this limits the utility of the article and also necessitates the application of more drastic cooling in order to harden the article sufficiently for removal from the mold.

An object of the present invention is to provide a cellulose acetate composition being unique in that it possesses satisfactory molding properties and gives an article of unusual rigidity combined with reasonable strength and toughness and complete freedom from exudation. A further object of the invention is to provide such a molding composition which is far more readily molded than compositions giving molded articles having a comparable degree of rigidity and toughness. A still further object is to provide such a molding composition which is comparatively non-inflammable. Other objects of the invention will be apparent from the description given hereinafter.

The above objects are accomplished according to the present invention by formulating a molding composition comprising, per 100 parts of cellulose acetate, 20–65 parts of mixed plasticizer consisting essentially of 35–45% camphor, 25–37.5% triphenyl phosphate, and 25–37.5% toluol sulphonamide plasticizer. In a preferred embodiment of the invention the molding composition also comprises 1–6 parts of diethylene glycol per 100 parts of cellulose acetate. All parts and percentages given throughout the specification are by weight unless otherwise specified.

The present invention resides in the unexpected effect of the above mixed plasticizer when used with cellulose acetate in molding compositions in the proportions set forth. The compositions of the present invention have highly acceptable molding properties and give molded articles of unusual rigidity and reasonable strength and toughness, and freedom from exudation. That these molding compositions should have such properties is totally unpredictable from a consideration of the effect on cellulose acetate of each of the individual components of the mixed plasticizer, or a consideration of the effect on cellulose acetate of any combination of two of the three individual components of the mixed plasticizer.

Triphenyl phosphate is a recognized fire-retardant plasticizer but its use in appreciable proportions in cellulose acetate compositions is known to be distinctly limited because of its weak plasticizing action and poor compatability with cellulose acetate, which tends to result in brittleness and exudation. Heretofore it has been used almost entirely because of its fire retarding property and only where this advantage overbalances its inherent disadvantages in other respects. The aryl sulphonamide plasticizers are characterized by weak solvent power on cellulose acetate and a strong tendency to exude in cellulose acetate compositions. These aryl sulphonamide plasticizers also have a tendency to produce brittle cellulose acetate compositions of poor stability toward light and heat. Camphor is a poor solvent for cellulose acetate and tends to yield weak and brittle articles and, further, because of its poor compatibility with cellulose acetate, it also tends to evaporate rapidly from the finished product.

The combination of any two of the three components of the mixed plasticizer of the present invention likewise fails to have any effect on cellulose acetate that would suggest the feasibility of the herein considered mixed plasticizer. Cellulose acetate plastics made with triphenyl phosphate and a toluol sulphonamide are characterized by a strong tendency to exude; cellulose acetate plastics made with camphor and triphenyl phosphate lack the facility in molding of the compositions of the present invention; those made with camphor and toluol sulphonamide are not sufficiently slow burning. These are the outstanding deficiencies of the various combinations of any two of the three components of the mixed plasticizer but other deficiencies are present to a considerable extent.

In the present compositions, the total plasticizer content is desirably between 20–65 parts per 100 parts of cellulose acetate; compositions over this entire range are useful in compression molding while compositions from about 25–65 parts of the mixed plasticizer are particularly desirable for use in injection molding.

In the mixed plasticizer, the camphor content should range between 35–45%, preferably about 40%, the triphenyl phosphate should range from 25–37.5%, preferably about 30%, and the toluol sulphonamide should range from 25–37.5%, preferably about 30%. A further feature of the present invention resides in the discovery that diethylene glycol, when used in conjunction with the mixed plasticizer, functions as a die lubricant and an activator. The term "activator", as used herein, refers to a substance which, in a manner somewhat analogous to the action of non-solvent ethyl alcohol upon camphor when used with pyroxylin, has the effect of facilitating and accelerating the solvent action of the plasticizer with which it is associated. Diethylene glycol is a valuable but not essential ingredient of the compositions of the present invention and should be used in proportions of from 1–6 parts per 100 parts of cellulose acetate, 2–4 parts being preferred. In place of diethylene glycol, other mold lubricants such as ethyl palmitate, aluminum palmitate, carnauba wax, zinc stearate, stearic acid, and higher alcohols such as a mixture of alcohols of 12, 13, and 14 carbon atoms, may be used. These mold lubricants will be used in customary proportions and it has been noted that the tendency of some of these mold lubricants to cause exudation in articles molded of heretofore known cellulose acetate compositions is absent when they are used in conjunction with the present mixed plasticizer.

In the following examples are given specific embodiments of compositions according to the present invention:—

Example 1

| | Parts |
|---|---|
| Cellulose acetate | 100 |
| Total plasticizer | 52 |

Total plasticizer consisted of:

| | Percent |
|---|---|
| Camphor | 38.4 |
| Triphenyl phosphate | 30.8 |
| Para toluol sulphonamide | 30.8 |

Example 2

| | Parts |
|---|---|
| Cellulose acetate | 100 |
| Total plasticizer | 52 |
| Aluminum palmitate | 0.5 |

Total plasticizer consisted of:

| | Percent |
|---|---|
| Camphor | 38.4 |
| Triphenyl phosphate | 30.8 |
| Mixture of ortho and para toluol sulphonamides | 30.8 |

Example 3

| | Parts |
|---|---|
| Cellulose acetate | 100 |
| Total plasticizer | 56 |
| Diethylene glycol | 3 |

Total plasticizer consisted of:

| | Percent |
|---|---|
| Camphor | 35.7 |
| Triphenyl phosphate | 28.6 |
| Mixture of ortho and para toluol sulphonamides | 35.7 |

Example 4

| | Parts |
|---|---|
| Cellulose acetate | 100 |
| Total plasticizer | 65 |
| Diethylene glycol | 5 |

Total plasticizer consisted of:

| | Percent |
|---|---|
| Camphor | 43.1 |
| Triphenyl phosphate | 27.7 |
| Mixture of ortho and para toluol sulphonamides | 29.2 |

Example 5

| | Parts |
|---|---|
| Cellulose acetate | 100 |
| Total plasticizer | 25 |
| Diethylene glycol | 1.5 |

Total plasticizer consisted of:

| | Percent |
|---|---|
| Camphor | 40 |
| Triphenyl phosphate | 30 |
| Mixture of ortho and para toluol sulphonamides | 30 |

Example 6

| | Parts |
|---|---|
| Cellulose acetate | 100 |
| Total plasticizer | 44 |
| Diethylene glycol | 4 |

Total plasticizer consisted of:

| | Percent |
|---|---|
| Camphor | 40 |
| Triphenyl phosphate | 30 |
| Mixture of ortho and para toluol sulphonamides | 30 |

The above examples are merely illustrative of the present invention and it will be understood that, in addition to the cellulose acetate and the mixed plasticizer, various conventional ingredients may be used in the molding compositions of the present invention, including dyestuffs, pigments, residual volatile solvents, moisture picked up through the hygroscopicity of the cellulose acetate, and the like. The particular manner of molding the herein disclosed compositions is optional although compression or injection molding will generally be used. The unusual ease of molding characteristic of these compositions makes them especially suited for injection molding. The aryl sulphonamide component of the mixed plasticizer is preferably either straight para toluol sulphonamide or a mixture of ortho and para toluol sulphonamides, due to the fact that these are commercially available and give perhaps somewhat better results. However, other aryl sulphonamides known to those skilled in the art may be used in the invention. Among such sulphonamides may be mentioned para toluene mono ethyl sulphonamide, a mixture of ortho and para toluene mono ethyl sulphonamides, para xylene sulphonamide, a mixture of ortho and para xylene sulphonamides, and para toluene mono cyclohexyl sulphonamide. The closely related compound, para toluene sulphonanilide, is also an equivalent of the sulphonamides mentioned above.

The specific manner in which the compositions of the present invention are mixed forms no part of the present invention and the mixing of the ingredients can be carried out according to the conventional methods known in the art. For example, where a molding composition is to be made, the various ingredients can be kneaded in a Banbury mixer or, if desired, they may be worked on the rolls. Ordinarily, where the compositions are to be used in molding, they will be comminuted to give a molding compound of granular or pulverulent form. Although the compositions of the present invention are more generally designed for use in molding, they may be worked up into sheet form according to standard practices in the cellulose derivative plastics art.

A particular characteristic of the herein disclosed molding compositions is that they can be molded into articles having exceptional rigidity although not extreme toughness. For this reason, the compositions are less suited for use in molding articles of delicate shape and thin wall. This deficiency in toughness is accompanied by superior molding characteristics and these compositions have a special value for rapid and economical molding, particularly by the injection method, of articles of comparatively massive configuration where extreme strength and toughness of material are unnecessary. Such articles include keys for adding machines, and the like, handles, automobile hardware, tooth brush handles, toilet articles, boxes, novelty jewelry, buckles, buttons, ornaments, bag frames and fittings, umbrella handles and rib tips, and even combs of fairly heavy cross section.

An advantage of the present invention is that it provides cellulose acetate molding compositions characterized by a unique combination of rigidity with ease of molding. Due to this ease of molding, important economies can be effected in the manufacture of molded articles, particularly by injection molding, from these molding compositions. They do not require prolonged heating at a high temperature and are, accordingly, less subject to the discoloring effect of such treatment. In compression molding they do not require high pressures and hence are rapidly molded in equipment of ordinary construction. The fact that, with increase in temperature above the temperature at which they first soften, they soften rapidly, or, in other words, the fact that the intervals between their respective softening and molding temperatures are comparatively short, facilitates and speeds up the process of injection molding by making them readily soften to the necessary degree and by facilitating their rapid hardening in the unheated molds, so that the molding cycle is relatively short. Also, they have the desirable characteristic of being capable of being injection-molded satisfactorily over wide ranges of cylinder temperatures so that close control of the latter is not a troublesome necessity as in the case of many molding compounds heretofore known. From a properly polished die, the herein described compositions are removed with an excellent high gloss. Articles molded from these compositions have exceptional rigidity and, except in very thin wall articles, entirely satisfactory toughness and strength and they are characterized by a satisfactory slow burning rate.

As many apparently widely different embodiments of this invention may be made without departing from the spirit and scope thereof, it is to be understood that the invention is not limited to the specific embodiments thereof except as defined in the appended claims.

I claim:

1. A plastic composition comprising 100 parts of cellulose acetate and 20–65 parts of a mixed plasticizer therefor consisting of 35–45% camphor, 25–37.5% triphenyl phosphate, and 25–37.5% of an aryl sulphonamide plasticizer.

2. A plastic composition comprising 100 parts of cellulose acetate and 20–65 parts of a mixed plasticizer therefor consisting of 35–45% camphor, 25–37.5% triphenyl phosphate, and 25–37.5% of toluol sulphonamide.

3. A plastic composition comprising 100 parts of cellulose acetate and 25–65 parts of a mixed plasticizer therefor consisting of approximately 40% camphor, 30% triphenyl phosphate and 30% toluol sulphonamide.

4. A molding composition comprising 100 parts of cellulose acetate, 20–65 parts of a mixed plasticizer therefor consisting of 35–45% camphor, 25–37.5% triphenyl phosphate, and 25–37.5% of an aryl sulphonamide plasticizer, and a mold lubricant.

5. A molding composition comprising 100 parts of cellulose acetate, 20–65 parts of a mixed plasticizer therefor consisting of 35–45% camphor, 25–37.5% triphenyl phosphate, and 25–37.5% of an aryl sulphonamide plasticizer, and 1–6 parts of diethylene glycol.

6. A molding composition comprising 100 parts of cellulose acetate, 20–65 parts of a mixed plasticizer therefor consisting of 35–45% camphor, 25–37.5% triphenyl phosphate, and 25–37.5% of toluol sulphonamide, and 1–6 parts of diethylene glycol.

7. A composition adapted for use in injection molding consisting of 100 parts of cellulose acetate, 25–65 parts of a mixed plasticizer therefor comprising 35–45% camphor, 25–37.5% triphenyl phosphate, and 25–37.5% of toluol sulphonamide, and 1–6 parts of diethylene glycol.

8. A composition adapted for use in injection molding consisting of 100 parts of cellulose acetate, 25–65 parts of a mixed plasticizer therefor comprising approximately 40% camphor, 30% triphenyl phosphate, and 30% of toluol sulphonamide, and 2–4 parts of diethylene glycol.

MAURICE L. MACHT.